United States Patent [19]
Zierpka

[11] 3,910,422
[45] Oct. 7, 1975

[54] FEEDING ARRANGEMENT FOR TRANSPORTING MATERIAL AND WORKPIECES

[75] Inventor: Gunter Zierpka, Karlsruhe, Germany

[73] Assignee: Gesellschaft fur Pressen-Automation mbH, Karlsruhe, Germany

[22] Filed: Sept. 4, 1974

[21] Appl. No.: 502,952

[30] Foreign Application Priority Data
Sept. 29, 1973 Germany............................ 2349126

[52] U.S. Cl............................. 214/1 BB; 198/218
[51] Int. Cl.² ........................................ B65G 61/00
[58] Field of Search........ 214/1 R, 1 BB, 1 BT, 1 B; 198/218

[56] References Cited
UNITED STATES PATENTS
3,707,908  1/1973  Merk et al.................... 214/1 BB X
3,753,489  8/1973  Tomloka et al............... 214/1 BB X Primary Examiner—Frank E. Werner
Attorney, Agent, or Firm—Max Fogiel

[57] ABSTRACT

A feeding arrangement for transporting material or work-pieces, with a pair of gripper bars moveable back and forth in the feed direction. The gripper bars extend along the transport path, and are moveable separately from one another, in the vertical direction and transversely to the feed direction. A cam drive has three cams on a common shaft, with each cam used for generating the gripper bar motions in one predetermined direction, particularly for transporting workpieces in presses with several fabricating stations following one another in the feed direction. A lifting frame having a cam follower operating in conjunction with a cam to generate vertical motions, is in contact with the gripper bars running in lengthwise guides and in cross rails on the lifting frame.

10 Claims, 5 Drawing Figures

FEEDING ARRANGEMENT FOR TRANSPORTING MATERIAL AND WORKPIECES

BACKGROUNDD OF THE INVENTION

The present invention concerns a feeding device for the step-by-step transport of material and/or workpieces, with a pair of gripper bars moveable in the feed direction. The gripper bars extending along the transport path are moveable jointly in the vertical direction and transversely to the feed direction, separately from one another. The device has a cam drive with three cams on a common shaft. Each of these cams is used for generating the gripper bar motions in one of the three dimensions. Feeding devices of this type are used frequently for the transport of workpieces in presses with several fabricating stations following one another in the feed direction, or for tieing together several presses which constitute a processing line.

For technical and tool engineering reasons, workpieces cannot, as a rule, be fabricated in one operation. Especially in sheet metal processing, the fabrication requires several operations in one press or in several presses tied up with one another.

For transporting the workpiece, one uses so-called gripper bar devices having gripper bars which move back and forth in the feed direction, and are provided with gripping tongs. To obtain closing and opening movements transverse to the feed direction, these gripper bar devices have gripper bars which can be moved toward one another. However, the gripper bars of these devices can make movements only in a plane so that either only flat workpieces can be moved from station to station, or each station has to be equipped with means for lifting off work pieces with vertical dimensions.

However, devices with vertically moveable means for transporting workpieces are known in the art. German Pat. Nos. 1,802,629 and 1,802,630 describe devices for transporting workpieces from station to station nin presses. The feeding proceeds in the following manner:

After closing the means for gripping the workpieces, the latter are lifted onto an elevated transport plane. They are then transported to the next station, where they are lowered and deposited in a fixture by opening the gripping devices. Then the feeding devices are retracted in the lowered position, and the initial position is attained again. The movement can start once more, and a subsequent workpiece can be grasped for transport, -which workpiece had been delivered during the preceding feeding step to the initial station.

The devices known from the above-mentioned patents are devices with parallel bars moving to and fro with gripper tongs which are located on the latter and are moveable in a transverse direction. These feed motions of the gripper tongs towards the workpiece, as well as the gripping and opening motions, are transmitted by special linkages which extend along the guides in contact with the gripper tongs and the latter, as well as along the bars carrying the control or transmitting elements. This entire arrangement of bars moving to and fro, with the devices located on top for gripping the workpieces and with the associated drive and control elements, is linked to lifting devices which are spaced apart lengthwise along the press. They are driven by means of gear racks (moveable to and fro) through suitable transmissions (gear trains) converting the horizontal drive motions into vertical lifting motions.

From Ger. Pat. FR-PS 1,298,621 there is also known a device with gripper bars operating with the following cycle: lift - feed - lower - open - retract. Its drive motion is derived from three cams located on a common drive shaft. The motions derived from the cams are transmitted partially through gear trains and partially through multi-link linkages, to the gripping bars. In view of the extensive and complex transfer elements, an exact transfer of the motions derived from the cams to the gripper bars appears not to be possible.

Based on this state of the art, it is an object of the present invention to provide a device for transporting workpieces in presses where the motions derived from the cams, are simultaneously transmitted in the shortest manner to both gripper bars, while distortion of the motion is prevented.

Another object of the present invention is to provide an arrangement of the foregoing character which is simple in design and in construction.

A further object of the present invention is to provide a feeding arrangement for transporting material and workpieces which may be easily serviced, and have a substantially long operating life.

SUMMARY OF THE INVENTION

The objects of the present invention are achieved by providing a lifting frame located vertically in the device frame. This lifting frame has a cam follower in contact with the cam for the generation of vertical movements. This lifting frame, furthermore, accommodates in cross rails (guides) the gripper bars which, in turn, are running in lengthwise guides.

Accordingly, a feature of the invention is that only the gripper bars, accommodated by a lifting frame and moveable transversely to the feed direction in cross rails contained in the lifting frame, are moved with their lengthwise guides vertically as a function of the motion provided by the drive cam. This assures direct transmission of the motion from the associated cam to the gripper bars. The masses subject to the vertical motion are limited to the gripper bars themselves, and the guide elements accomodating the latter.

A practicable embodiment of the present invention, the lifting frame is located directly above the cam generating the vertical motions, and the lifting frame is made symmetrical with respect to a vertical plane in the feed direction. The transverse guides may consist of guide rails on the lifting frame, and of slides moveable along these rails; these slides carry the lengthwise guide elements of the gripper bars.

In the present invention, the following arrangement was found practicable:

The transverse motions, also derived from a cam, are transmitted to the gripper bars by a follower which is forcelocked to each slide, and is in contact with a vertical guide. When the transverse driving means are located in a plane running transversely to the feed direction and directly on the means for raising and lowering the gripper bars, the transverse drive means are connected to the slides in the most compact manner by having each slide of the transverse guides receive the follower of the transverse drive element in a vertical groove.

From the viewpoint of compact design, the following was found to be advantageous. The elements for lifting and lowering the gripper bars are located at the end of a housing accommodating the shaft with cams. These elements, furthermore are contained in a housing attached to the housing box. In another advantageous feature of the present invention, the cam follower for deriving the vertical motion from the cam generating it, is located on a rocker arm. The rocker arm is hinged about a pivot to the lifting frame, and can be rotated between an operating position and a retract position which leaves the cam follower out of contact with the cam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
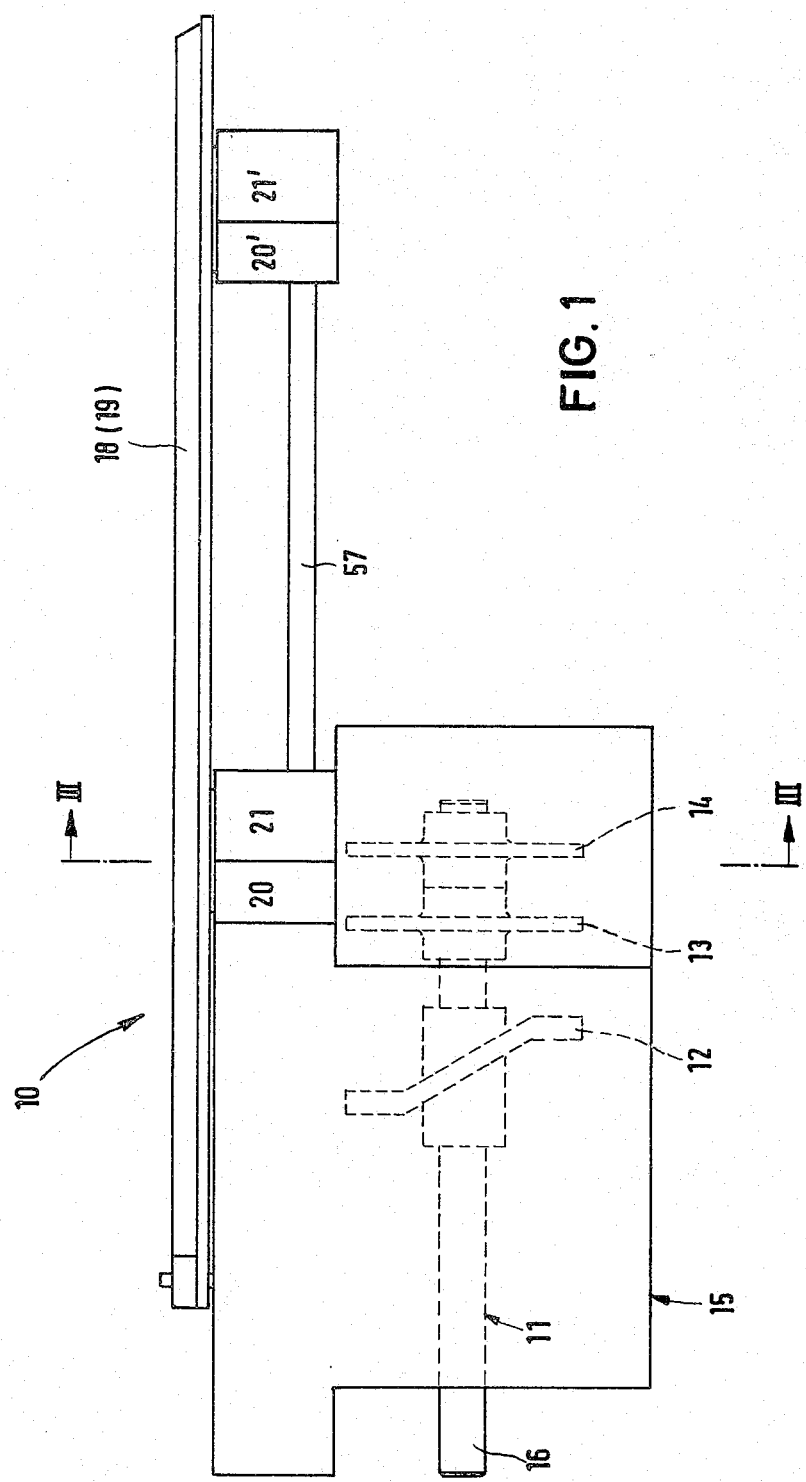
FIG. 1 is a schematic front view of a feeding device according to the present invention, with gripper bars extending transversely through a press.
Figure 2:
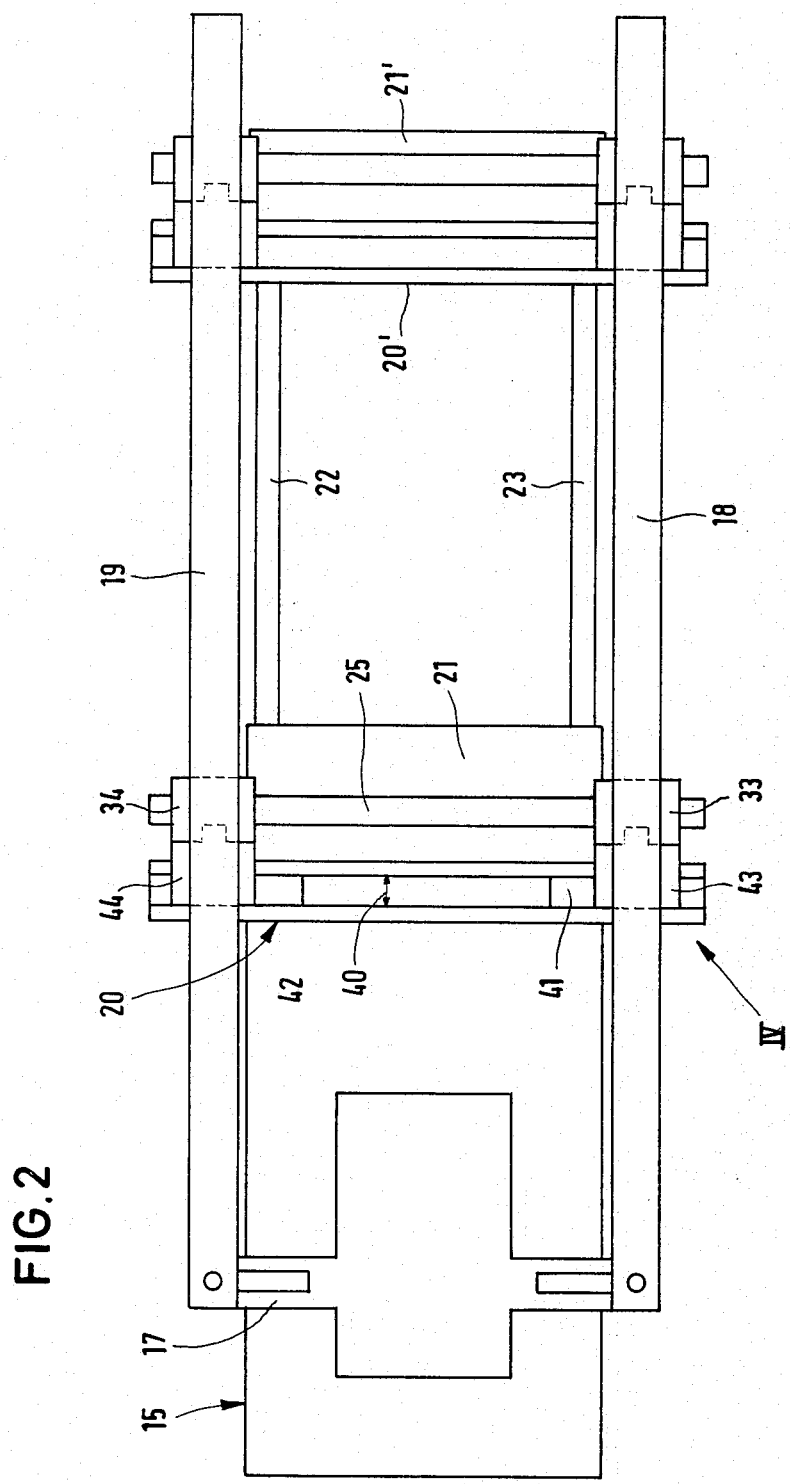
FIG. 2 is a plan view of the device shown in FIG. 1.
Figure 3:
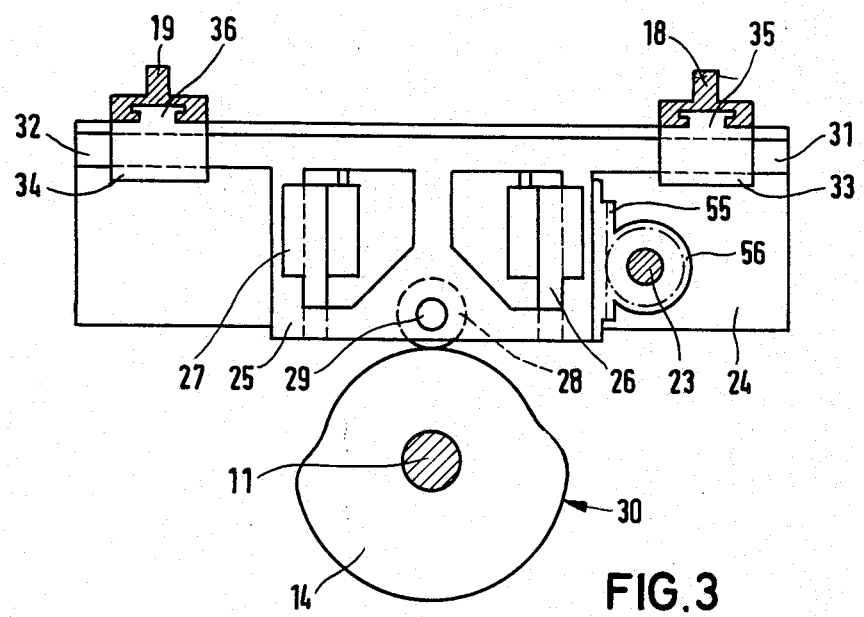
FIG. 3 is a sectional view taken along line III—III in FIG. 1, with the means for raising and lowering the gripper bars being enclosed by crossrails.

In device 10, shown in FIGS. 1 and 2, three cam plates 12, 13, 14 are located coaxially on a main shaft running in the longitudinal direction of the gripping bars. The shaft rotates in a housing 5 and is driven through a shaft end 16 extending laterally beyond the housing, in a conventional manner synchronous with the drive of the processing machine to which the feeding device is attached. Cam plate 12 provided with an axial curve is used for generating the driving motion of the gripper bars in the feeding direction, corresponding to the gripper bar longitudinal direction. The gripper and opening motions of the gripper bars are derived from the radial cam plate 13. Radial cam plate 14 is used for generating vertical gripper bar motions.

The feeding motions derived from cam plate 12 are transmitted through a traverse rod 17 which moves back and forth in the feeding direction. In the feeding direction, the traverse rod 17 is connected rigidly with gripper bars 18, 19, but transversely to the feeding direction the connection is adjustable or slidable.

Located above each of cam plates 13, 14 is a unit 20, 21 with means for transmitting the gripping and opening motions derived from these cam plates, on the one hand, and for transmitting the vertical motions to the gripper bars, on the other hand. Similarly shaped drive units 20', 21' are attached to the other end of the gripper bars. Drive units 20, 20' are connected through drive shaft 22 running parallel to the gripper bars. A similar shaft connection 23 exists between drive unit 21, containing the means for transmitting the vertical motions, and the associated drive unit 21' at the other end of the gripper bar.

Drive unit 21 contains a lifting frame 25 which can slide vertically in the housing or in frame 24 of the unit by means of guides 26, 27 (only indicated). This lifting frame has a cam follower 28 in the shape of a roller which is made rotary by means of a trunnion 29. This roller runs directly on the cam track 30 of the radial cam plate 14 in a force-locking manner. On its top side, the lifting frame has cross rails. These cross rails extend symmetrically to the feeding axis of the gripper bars in both directions, and consist of a guide rail 31, 32 each, and a slide 33, 34 sliding in each guide rail. To each slide, there is fastened a gripper bar lengthwise guide 35, 36, each of which accomodates a gripper bar 18, 19 that is moveable in the feeding direction.

The transverse drive of the gripper bars is made by drive unit 20 derived from radial cam plate 13. On the topside of the housing enclosing the drive unit, there are two slides 41, 42 sliding in a cross rail and moveable toward one another transversely to the feeding direction. Each of these slides has a follower 43, 44, and each follower is force-locked and coupled to one of slides 33, 34 of the cross rails belonging to lifting frame 25.

Figure 4:
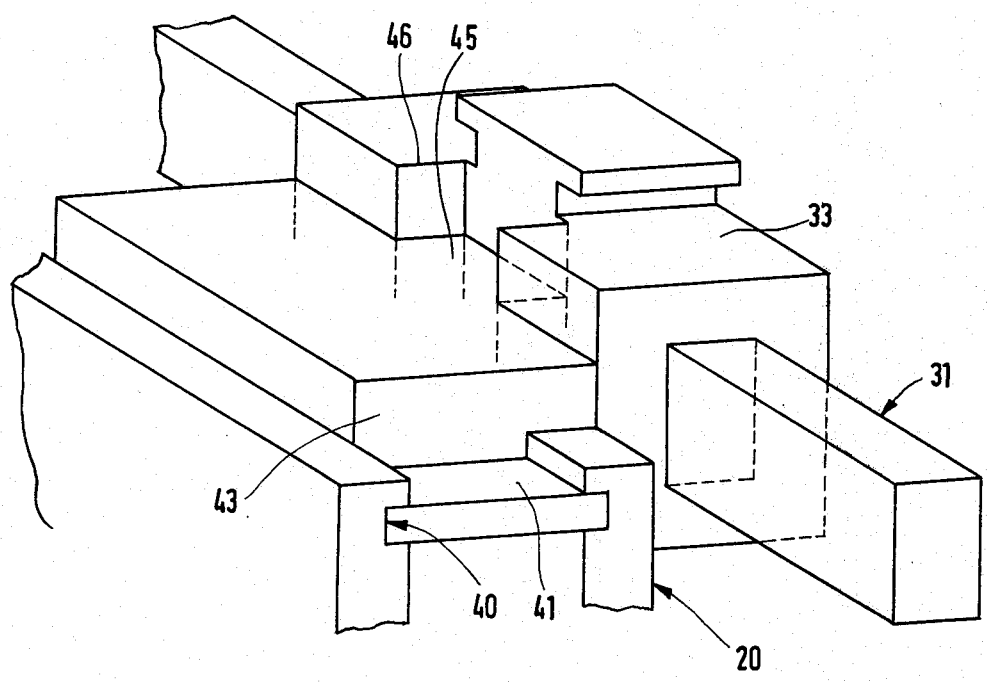
FIG. 4 is a perspective view, when viewed in the direction of the arrow in FIG. 2, and shows the shape of the crossrails on the lifting frame and the connection of the transverse drive for transmitting the gripping and opening motions to the gripper bars.

FIG. 4 shows the details of this coupling connection. Cam follower 43, rigidly fastened to slide 41 and hence moveable in a plane determined by cross rail 40 of drive unit 20, mates, through a lug 45, with a rectangular vertical groove 46. This groove is located in a slide 33 on the side facing drive unit 20. The slide, in turn, is guided by guide rail 31 of lifting frame 25 and is moveable in the transverse direction. In FIG. 4, the lifting frame is slightly raised from its bottom position. It is shown, there, that lug 45 of cam follower 43 is force-locked with the vertical groove 46 of slide 33 during the vertical motion of lifting frame 25. As a result, the force-locked coupling connection of the transverse drive device of the drive unit 20 with the slides moving along the guide rails of the lifting frame, is maintained independent of the vertical position of the lifting frame.

In accordance with the present invention, only the gripper bars with their lengthwise guide devices are mating with the slides which in turn are guided in a moveable manner along the lifting frame. Accordingly, only the gripper bars and their guide rails participate in the vertical motion. The means for transmitting the gripping and opening motions, on the one hand, and the back and forth motions, on the other hand, are located in fixed planes and connected with the lifting and lowering gripper bars through force-locked couplings.

Figure 5:
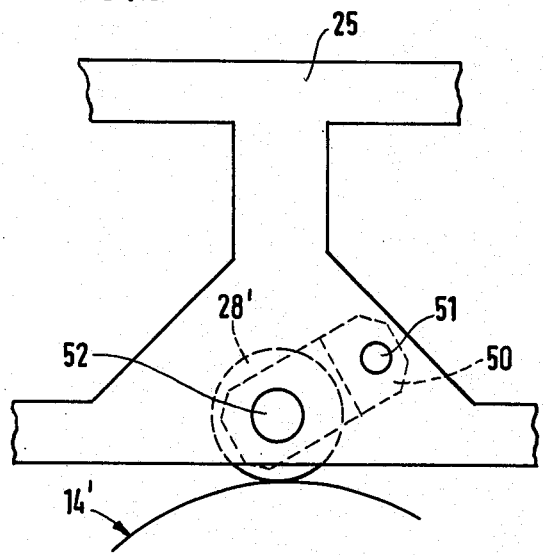
FIG. 5 is a partial schematic view of a possible linkage of the cam plate follower with the lifting frame, in accordance with the present invention.

FIG. 5 shows in a cutout view, the disconnectable arrangement of the cam plate follower 28' with the lifting frame 25 by means of a rocker arm 50. The rocker arm is hinged to lifting frame 25 by means of a pivot 51. At the end away from pivot 51, the rocker arm has a journal pivot 52 which is in contact with the cam follower. In the position shown in FIG. 5, where cam follower 28' is in contact with the curved path of cam 14', the position of the rocker arm is established, by means not shown here. By rotating the rocker arm about pivot 51, the cam follower 28' can be disconnected from the operating position. Hence drive unit 21 transmitting the vertical motions to the gripper bars can be disconnected. When the cam follower is in the disconnect position, the device can be operated by gripper bar motions in a plane.

Without further analysis, the foregoing will fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A feeding arrangement for step-wise transporting of material or workpieces comprising, in combination, a pair of gripper bars moveable back and forth in the feeding direction; said gripper bars extending along the transport path; means for moving said gripper bars separate from one another in the vertical direction and transversely to the feeding direction; cam drive means having three cams on a common shaft, each of said cams generating the gripper bar motions in one predetermined direction of motion; a base frame; a lifting frame vertically movable in said base frame; cam follower means carried by said lifting frame and operating with one of said cams for generating vertical motion, said lifting frame having longitudinal guide means and transverse guide means for guiding said gripper bars in longitudinal and transverse directions.

2. The feeding arrangement as defined in claim 1 wherein said lifting frame is located directly above said cam for generating vertical motion, said lifting frame being symmetrical with respect to a vertical plane extending in the feed direction.

3. The feed arrangement as defined in claim 1 wherein said transverse guide means comprises guide rails on said lifting frame; slides moveable along said guide rails; and longitudinal guide means on said gripper bars carried by said slides.

4. The feeding arrangement as defined in claim 3 including follower means for transmitting the transverse motion from one of said cams to said gripper bars; and a vertical guide member for holding said follower means to one of said slides.

5. The feeding arrangement as defined in claim 4 including means for lifting and lowering said gripper bars, said follower means for transmitting transverse motions comprising transverse drive means located in a plane extending transversely to the feed direction and connected directly to said means for lifting and lowering said gripper bars, said follower means for transmitting transverse motions comprising a plurality of followers each in contact with one of said slides through a vertical groove.

6. The feeding arrangement as defined in claim 1 including housing means for holding said cam drive means with said cams and said common shaft; means for raising and lowering said gripper bars arranged at the end of said housing means; and a housing box attached to said housing means for holding said means for raising and lowering said gripper bars.

7. The arrangement as defined in claim 6 wherein said housing box is attached to said housing means by flange means.

8. The feeding arrangement as defined in claim 1 including a plurality of presses with fabricating stations following one another in the feed direction, said workpieces being transported between said presses and said fabricating stations.

9. The arrangement as defined in claim 1 wherein each of said cams generates the gripper bar motions in one of the three dimensions of space.

10. The feeding arrangement as defined in claim 1 wherein said transverse guide means comprises cross rail members.

* * * * *